United States Patent [19]

Assedo et al.

[11] Patent Number: 4,562,038
[45] Date of Patent: Dec. 31, 1985

[54] DEVICE FOR GUIDING A CONTROL CLUSTER IN A NUCLEAR REACTOR

[75] Inventors: Raphaël Assedo, Chatou; Eric Dubreux, Saint-Germain-En-Laye, both of France

[73] Assignee: Framatome & Cie, Courbevoie, France

[21] Appl. No.: 441,872

[22] Filed: Nov. 15, 1982

[30] Foreign Application Priority Data

Nov. 13, 1981 [FR] France ............................ 81 21270

[51] Int. Cl.⁴ .............................................. G21C 7/00
[52] U.S. Cl. .................................................. 376/353
[58] Field of Search ........................................ 376/353

[56] References Cited

U.S. PATENT DOCUMENTS

| | | | |
|---|---|---|---|
| 3,481,832 | 12/1969 | Rickert | 376/353 |
| 3,849,257 | 11/1974 | Bevilacqua | 376/353 |
| 3,979,257 | 9/1976 | Knodler et al. | 376/353 |
| 4,231,843 | 11/1980 | Myron et al. | 376/353 |
| 4,313,796 | 2/1982 | Buettiker | 376/353 |

FOREIGN PATENT DOCUMENTS 2411469  8/1979  France ............................ 376/353

*Primary Examiner*—Harvey E. Behrend
*Attorney, Agent, or Firm*—Pollock, Vande Sande & Priddy

[57] ABSTRACT

A device for guiding a control cluster consisting of several absorbing rods consisting of a casing in which are mounted continuous-guiding sleeves each provided with at least one cylindrical slide suitable for the vertical guiding of a rod, and each open with a vertical slot emerging in the slide. Each guiding slide (631, 641) is associated with two orifices (635, 645) forming a hollow in the two lips (633, 643) of the slot (632, 642) so that, when a rod (31) is in contact with the lips, the interior of the slide communicates with the slot.

6 Claims, 11 Drawing Figures

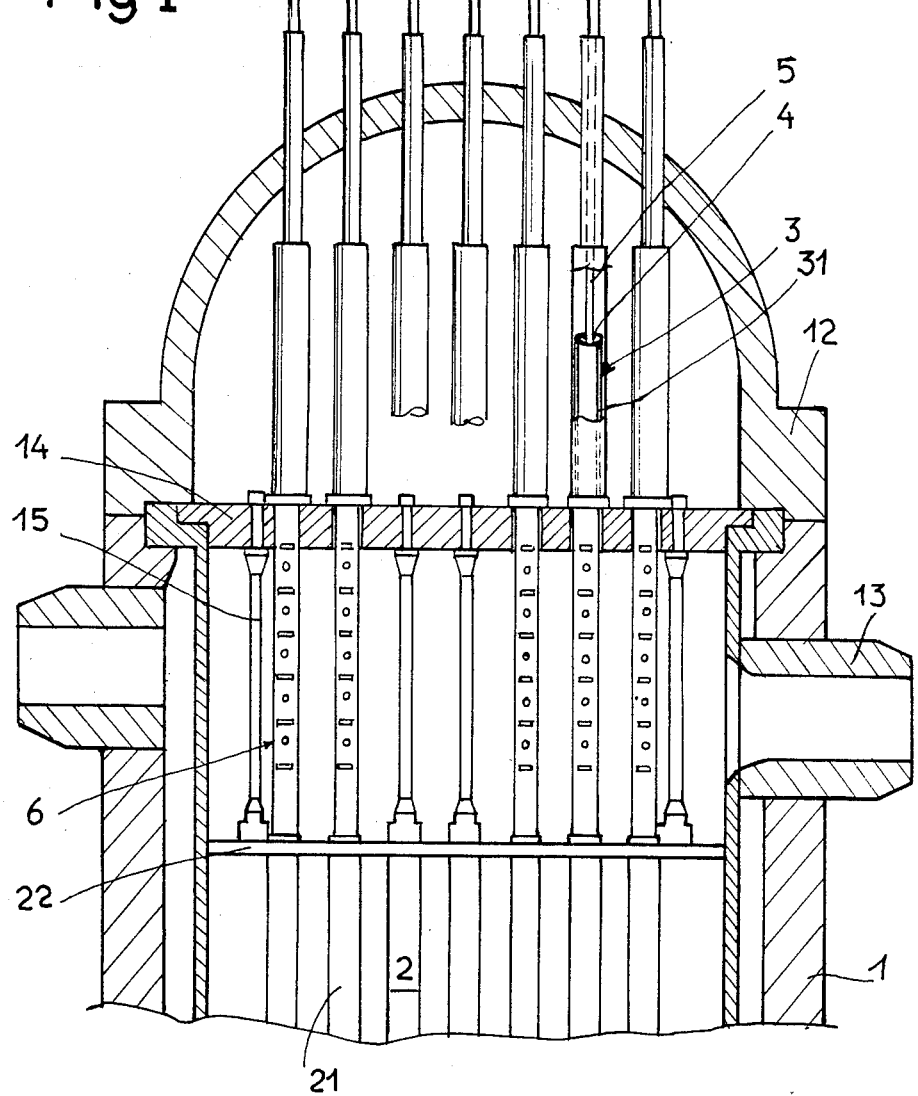

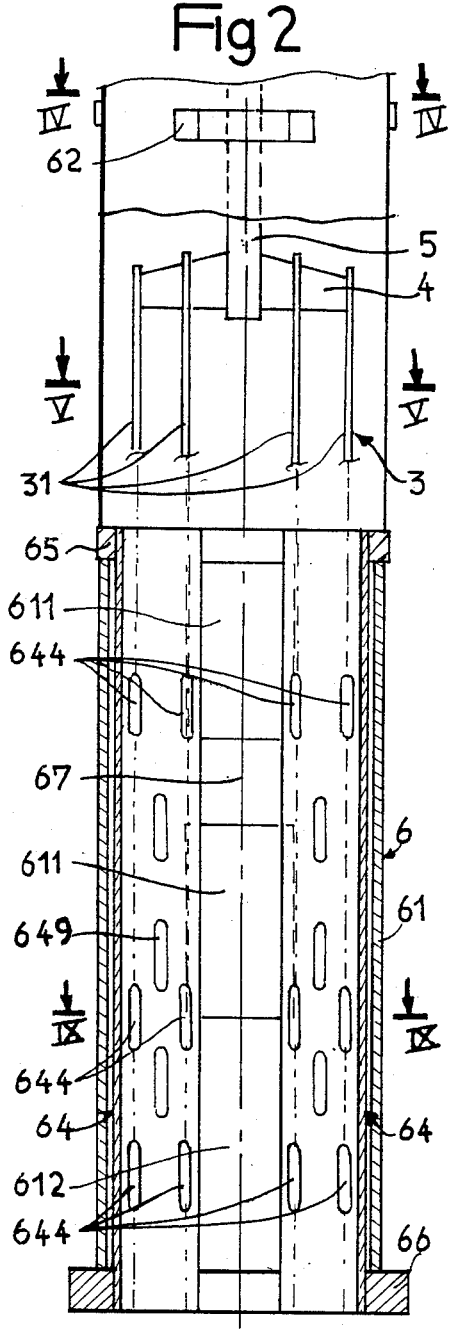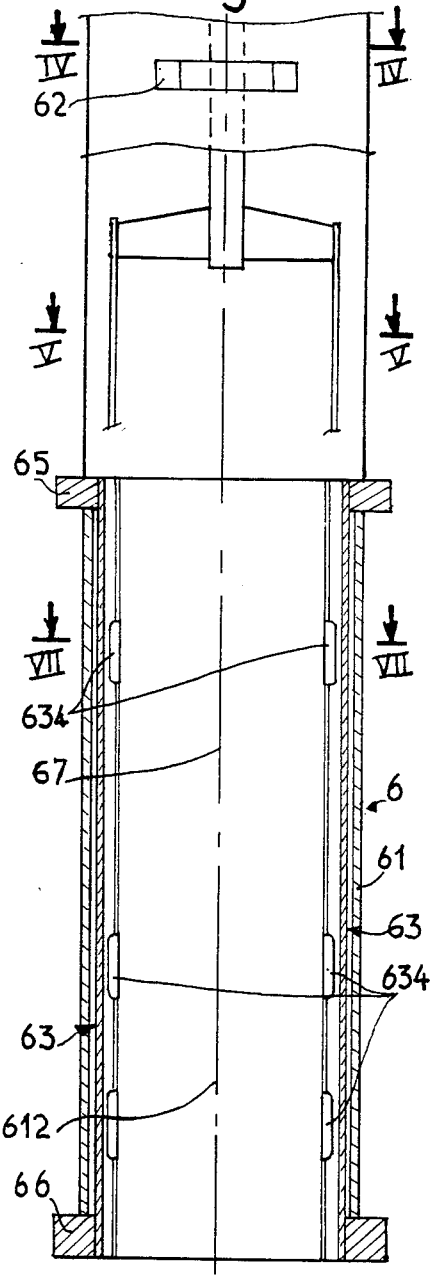

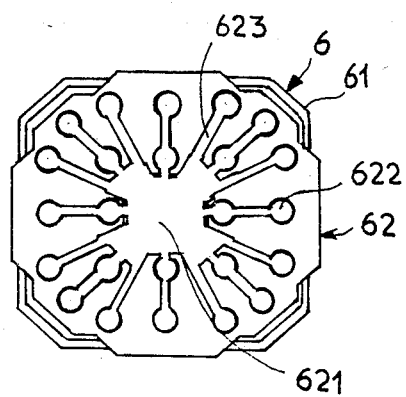
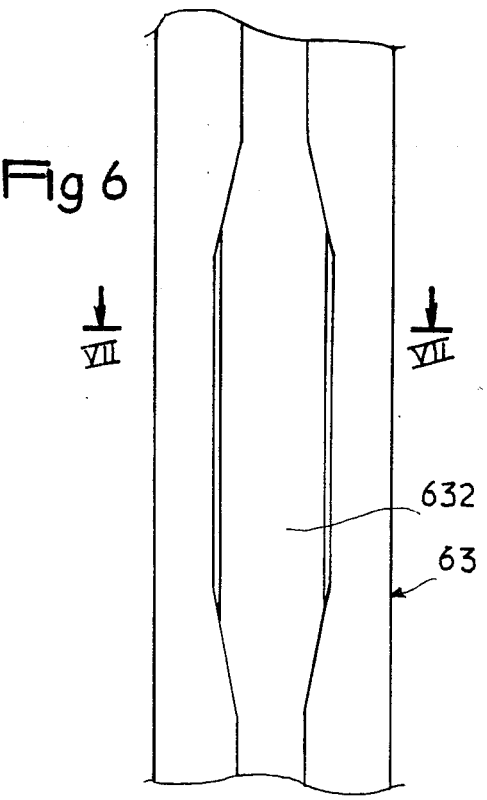
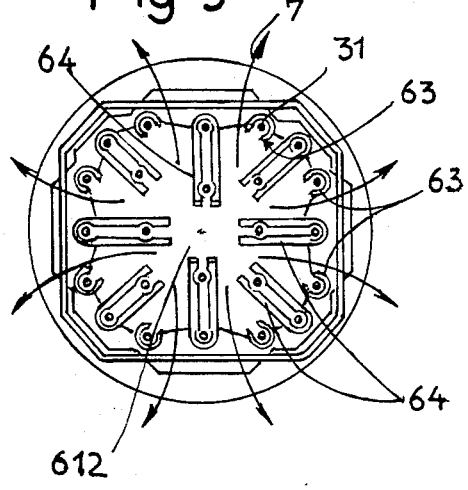
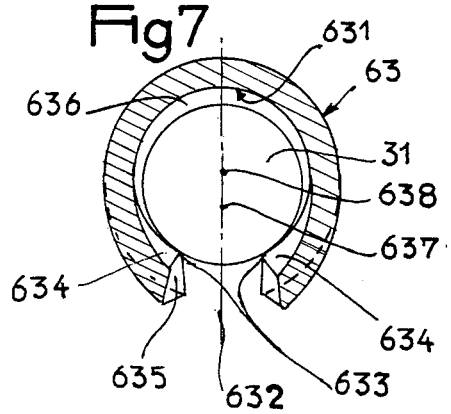

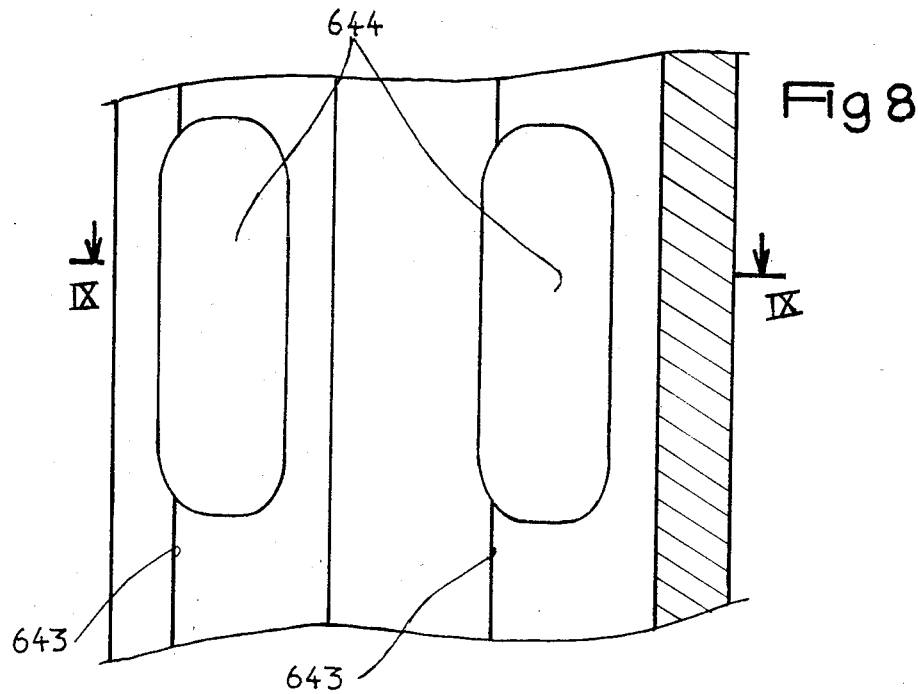
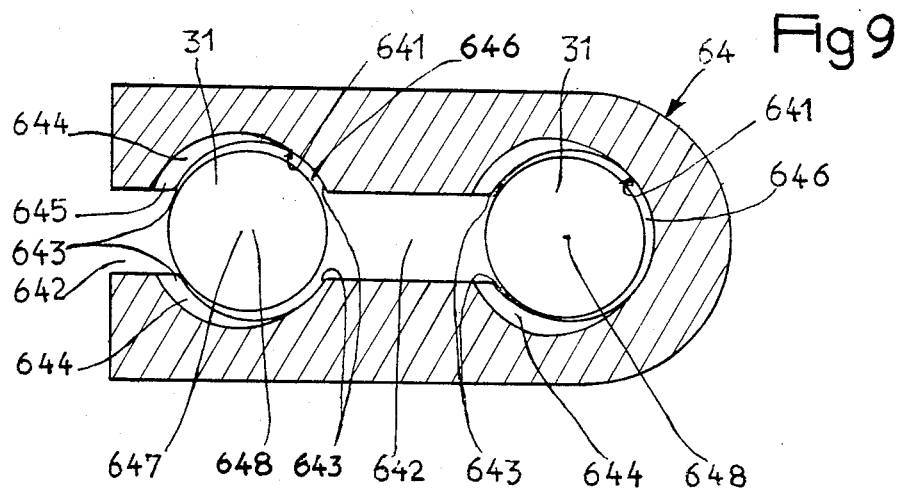

DEVICE FOR GUIDING A CONTROL CLUSTER IN A NUCLEAR REACTOR

FIELD OF THE INVENTION

The present invention relates to a device for guiding a control cluster consisting of several absorbing rods capable of being introduced between the fuel rods of the core in a nuclear reactor, in particular a pressurized water reactor.

BACKGROUND OF THE INVENTION

Each control cluster consists of absorbing rods suspended from a multi-arm support referred to as a "spider". This support is fixed to the lower end of a vertically operated bar. The absorbing rods must be able to be removed from the core or be introduced into the core, which requires perfect guiding over the entire length of their displacement.

A device for guiding a control cluster, which is in itself known, comprises a tubular casing extending between an upper core plate, which limits the core at the top, and a support plate. Horizontal plates, which make it possible to discharge the primary cooling liquid upwards, are located inside the guide casing in order to ensure discontinuous guiding of the rods. At the lower level, the casing contains a set of guide sleeves provided with slides which ensure the continuous guiding of the rods. Each guide sleeve possesses a longitudinal slot allowing the radial elements of the "spider" to pass through. At a height corresponding to the continuous guiding, the casing is provided with openings for discharging and diverting the primary cooling liquid. The guide casing receives the rising flow of liquid, which leaves the fuel arrays vertically, at the upper end of the core, and is then diverted horizontally towards the lateral outlets in the vessel. The casing is therefore located in a highly turbulent zone.

At the level of the continuous guiding, there is a pressure gradient in a horizontal plane. Because each guide sleeve is open, this pressure gradient tends to press the absorbing rod against the lips of the slot, causing wear by friction. To limit this phenomenon, pressure-equilibrating openings are provided in the faces of the guide sleeves, but this runs the risk of influencing the mechanical strength.

OBJECT OF THE INVENTION

The object of the invention is to produce continuous guiding of each absorbing rod of a control cluster, so that the pressure disequilibria around the rod—due to the hydraulic thrust—are reduced to a minimum. This continuous guiding does not affect the design of the guide sleeves, of the internal equipment or of the vessel. The invention makes it possible to reduce the effects of the hydraulic thrust inside the continuous guiding system, by equilibrating the pressures around the absorbing rod. This equilibration is effected by preventing the creation of the radial eddy-currents, by not reducing the strength of the sleeves, and by seeking the zones where the speed of the primary liquid is lowest, in order to prevent the perturbation of the flow.

SUMMARY OF THE INVENTION

The guide device consists of a casing in which are mounted continuous-guiding sleeves, each provided with at least one cylindrical slide suitable for the vertical guiding of a rod, and which are each open with a vertical slot emerging in the said slide. Each guiding slide is associated with two orifices forming a hollow in the two lips of the slot, so that, when a rod is in contact with the said lips, the interior of the slide communicates with the said slot.

The communication orifices are substantially symmetrical relative to the vertical plane passing through the middle of the slot and the axis of the slide, and they are produced by two notches surrounding a cylinder, the axis of which is offset relative to the axis of the slide, near the slot. The orifices can be produced by circular spot-facing around the slide.

BRIEF DESCRIPTION OF THE DRAWINGS

The invention will now be described in greater detail, with the aid of particular embodiments given by way of example. This description, which in no way implies a limitation, refers to FIGS. 1 to 11, in which:

FIG. 1 shows a general vertical section of the upper part of the reactor.

FIG. 2 shows a vertical section, passing through the double guide sleeves, of a guide device.

FIG. 3 shows a vertical section, passing through the single guide sleeves, of the guide device.

FIG. 4 is a cross-section along IV—IV of FIGS. 2 and 3. FIG. 5 is a cross-section along V—V of FIGS. 2 and 3.

FIG. 6 is a view of a detail of a single guide sleeve.

FIG. 7 is a section along VII—VII of FIGS. 3 and 6.

FIG. 8 is a view of a detail, in vertical section, of a double guide sleeve.

FIG. 9 is a cross-section along IX—IX of FIGS. 2 and 8.

DETAILED DESCRIPTION

Figure 10:
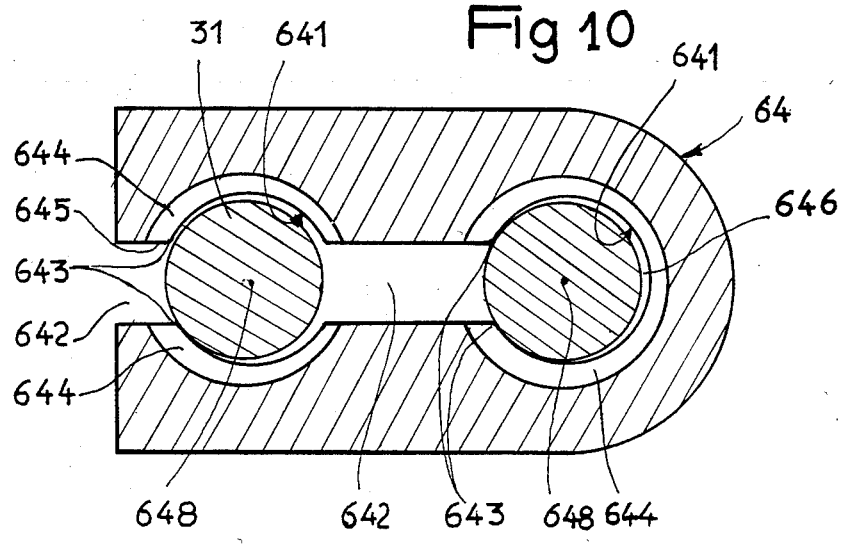
FIGS. 10 and 11 show, in cross-section, variants of a double sleeve.

FIG. 1 shows the upper part of a reactor, indicating the core 2 mounted inside the vessel 1. This vessel is covered by a dome cap 12 and is fitted with a lateral pipe 13 enabling the cooling liquid to flow out.

In the upper part, the core 2 is delimited by a core plate 22 located below a support plate 14. The core plate and the support plate are connected by columns 15. The core consists of juxtaposed fuel arrays 21. Each array is formed of a large number of vertical fuel rods.

The reactivity is adjusted by introducing control clusters 3, to a greater or lesser extent, into some of the arrays of the core. Each control cluster consists of several rods 31 of absorbing material. These rods are together suspended, by their upper ends, from a "spider" 4 with radial arms, which is firmly fixed to a control bar 5. The rods are introduced through passages in the core plate, so as to be positioned between the fuel rods of the corresponding array.

The control clusters are guided by means of guide devices 6. Each device comprises a casing 61 of parallelepipedal shape, which surrounds all the rods of the associated cluster. It passes through the support plate 14, from which it is suspended by means of a bolted flange.

The intermediate guide plates 62 are fixed in the casing 61 at various levels and at regular intervals. Each intermediate plate, shown in FIG. 4, ensures discontinuous guiding of the various rods of the cluster. It possesses a central opening 621 allowing the "spider" to pass through. Around this central opening, circular holes 622 are arranged, which ensure the guiding of the absorbing rods and which communicate with the said central opening by means of radial slots 623.

The continuous guiding is ensured by means of vertically arranged guide sleeves 63 and 64. The ends of these sleeves are fixed to two end plates 65 and 66. The spider can descend beyond the plate 66, which constitutes a flange for positioning the guide device on the core plate 22. The positioning is ensured by centering pins which are threaded into the upper core plate. This flange possesses openings, provided opposite the upper core plate 22, for allowing the cooling liquid leaving the core to pass through. Over a height corresponding to the continuous guiding, the casing 61 is provided with openings 611 permitting the lateral discharge of the rising liquid flow.

Each continuous-guiding sleeve 63 or 64 possesses at least one longitudinal slide 631 or 641, which has the shape of a cylinder, the diameter of which is matched to the diameter of the rod so as to ensure the guiding of the latter. Each slide of a sleeve emerges towards the center of the casing via a longitudinal and radial slot 632 or 642.

A single guide sleeve 63 possesses a single slide 631 in which the slot 632 emerges. The double guide sleeve 64 possesses two slides 641, which are connected to one another by the slot 642, which furthermore causes the central slide 641 to emerge with the central space 612.

The slot 632 or 642 allows an arm of the "spider" to pass through. Each slot 632 or 642 forms, with the slide, lips 633 or 643 spaced apart by a distance which is less than the diameter of the said slide.

Each guiding slide 631 or 641 is associated with at least one cavity 634 or 644 inscribed as a hollow in each of the lips 633 or 643, so as to create two orifices 635 or 645 when the rod 31 is in contact with these lips, the said orifices bringing the interior 636 or 646 of the slide into communication with the corresponding slot 632 or 642. The orifices 635 or 645 created on the two lips of the slot are symmetrical relative to the vertical plane of symmetry passing through the middle of the slot.

Two cavities 634 or 644 in one and the same sleeve are separated by a sufficient distance to ensure continuous guiding. These cavities are limited to a local interruption of the lips for supporting the rod, so that the remainder of the lips, over the entire height, always ensures the supported guiding of this rod. Relative to the openings 611 in the casing, the cavities are located in the zone where the speed of the cooling liquid is lowest. The cavities are located between equilibration holes 649, which are provided, in the double sleeves, for equilibrating the pressures.

In the embodiments of FIGS. 6 and 7 and FIGS. 8 and 9, the cavities 634 or 644 are produced by two cuts or notches surrounding a cylinder with an axis 637 or 647 which is offset, towards the axis 67 of the casing, relative to the axis 638 or 648 of the slide.

In the embodiment of FIG. 10, relating to a double sleeve, the cavities are produced by circular spot-facings inscribed as a hollow over the whole periphery of the slides.

Figure 11:
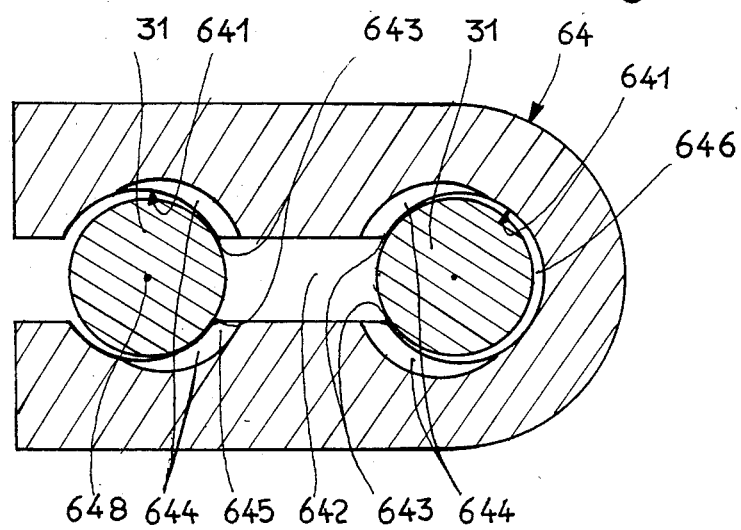

In the above embodiments, the orifices 635 or 645 are inscribed as a hollow in the lips located towards the axis of the casing, relative to the rod. As in FIG. 11, the orifices 645 can be inscribed as a hollow in the lips located towards the periphery of the casing, relative to the rod.

The operation of the guide device according to the invention will now be explained in greater detail.

The rising flow of the cooling liquid which leaves the fuel elements fills the casing and the gaps between the rods and the guide sleeves. The circulation currents, indicated by the arrows 7, set up, in a horizontal plane, four zones of high speed, opposite the openings 611 in the casing, and four zones of lower speed, corresponding to the corners of the casing. In practice, the internal volumes provided in the guide sleeves are dead volumes. The outflow rate through the equilibration openings 649 is insufficient relative to the inflow rate into the space 636 or 646 between the slide and the rod. An overpressure is therefore set up in the space 636 or 646 around or on one side of the rod. The latter therefore presses against the lips of the slot.

If the guiding of each rod 31 is now considered, it is possible to state that the zone 632 or 642 is a static zone which is itself surrounded by zones of lower pressure. In the case of a single guide sleeve, the zone 636 provided opposite this slot and behind the rod is a zone of overpressure. In the case of the double guide sleeve, the zone 642 between two rods is either a zone of overpressure or a zone of negative pressure, relative to the central zone 642, depending on the position of the guides relative to the openings 611 in the casing. This pressure disequilibrium therefore tends to press the rod against the lips located towards the centre of the casing, and, in certain cases, against the lips located in the opposite direction.

The cavities provided in the sleeves equilibrate the pressures between the zones 642 and 646 or 632 and 636. Because of the pressure difference prevailing between these zones, a flow is set up, from 646 towards 642 or from 636 towards 632, which will never be in opposition to the radiating radial flows directed towards the openings 611 in the casing.

The positioning of the cavities between the equilibration openings 649 makes it possible to prevent the weakening of the section subjected to the maximum bending stresses by the radial currents. Likewise, the positioning of the cavities at the base of the openings 611, on the upstream side of the liquid stream, prevents suction phenomena. The number of cavities or their shape can be modified, only the symmetry of a pair of orifices on the two lips of one and the same slot being imperative, with a radiating symmetry for all the rods.

The invention is applicable to any continuous guiding of a cluster of rods by means of a slotted tube or of a sleeve having lateral or radial outlets for liquid and an axial inlet.

We claim:

1. In a nuclear reactor comprising a control cluster (3) having a plurality of absorber rods (31) connected to a spider (4) having radial arms for suspension of said rods, a device for guiding said control cluster comprising (a) a casing (61) surrounding the rods (1) of said cluster, said casing having a longitudinal central axis;

(b) a plurality of guide sleeves (63, 64) vertically arranged in said casing and each having a cylindrical slide (631, 641) for continuously guiding one absorber rod (31) and one longitudinal slot (632, 642) extending the length of said sleeve and extending radially toward said longitudinal central axis to enable passage therethrough of an arm of said spider (4), the width of said slot being less than the diameter of any of said absorber rods, said slot being defined by a pair of lips (633, 643) which terminate said slide, each of said lips being formed with an inner edge and an outer edge, each lip of said pair of lips having a plurality of cavities arranged in said inner edge along the length of said lip, said cavities causing said inner edge to be uneven, said cavities being positioned at the same height in each lip of said pair of lips so as to form a plurality of pairs of cavities, said pairs of cavities being so constructed and dimensioned as to communicate the interior of said slide to the outside of said sleeve in all positions of said rod in said slide.

2. Device according to claim 1, wherein said cavities (634, 644) are arranged in two sets mutually symmetrical relative to the vertical plane of symmetry of said sleeve (63, 64).

3. Device according to claim 1 or 2, wherein said cavities (634, 644) are notches whose bottoms assume the shape of a cylinder the axis (637, 647) of which is offset relative to the longitudinal axis (638, 648) of said slide (631, 641).

4. Device according to claim 1, wherein said cavities (644) are produced by circular spot-facings around the entire periphery of said slide.

5. Device according to any one of claims 1, 2 and 4 wherein said cavities (634, 644) are separated along each of said lips by uninterrupted portions of said lips so as to ensure substantially continuous guidance.

6. In a nuclear reactor comprising a control cluster (3) having a plurality of absorbing rods (31) connected to a spider (4) having radial arms for suspension of said rods, a device for guiding said control cluster comprising (a) a casing (61) surrounding said rods (31) of said cluster, said casing having a longitudinal central axis;

(b) a plurality of guide sleeves (63, 64) vertically arranged in said casing and each having a pair of cylindrical slides for continuously guiding one absorber rod (3) and one longitudinal slot (632, 642) extending the length of said sleeve and extending toward said longitudinal central axis to enable passage therethrough of an arm of said spider (4) carrying said rods, the width of said slot being less than the diameter of any of said absorber rods, said slot having a first part opening out of said sleeve between a pair of adjacent lips and a second part connecting said slides and opening into said slides by respective pairs of adjacent lips, said sleeve being formed with pressure equilibration openings (649) opening into said second part, each of said lips being formed with an inner edge and an outer edge, each lip of said pair of lips having a plurality of cavities arranged in said inner edge along the length of said lip, said cavities causing said inner edge to be uneven, said cavities being positioned at the same height in each lip of said pair of lips so as to form a plurality of pairs of cavities (634, 644), said pairs of cavities being arranged between said pressure equilibration openings;

(c) said pairs of cavities formed each in a pair of adjacent lips being distributed along each said sleeve and being dimensioned for communicating both of said slides to the outside of said sleeve in all the positions of said absorber rods in said slides.

* * * * *